United States Patent [19]

Wilder

[11] 4,044,649
[45] Aug. 30, 1977

[54] CONVEYOR MECHANISM
[75] Inventor: Frank A. Wilder, Burlington, Vt.
[73] Assignee: General Electric Company, Burlington, Vt.
[21] Appl. No.: 397,846
[22] Filed: Sept. 17, 1973
[51] Int. Cl.$^2$ .............................................. F41D 9/02
[52] U.S. Cl. ................................. 89/33 BB; 198/798
[58] Field of Search ............. 89/33 BB, 33 BL, 33 C, 89/33 LA; 74/219; 198/25, 137, 138, 798

[56] References Cited
U.S. PATENT DOCUMENTS

| 581,803 | 5/1897 | Armstrong | 198/137 |
| 2,580,222 | 12/1951 | Gartner et al. | 198/137 |
| 2,820,400 | 1/1958 | O'Brien | 89/33 CA |
| 2,845,005 | 7/1958 | Stevens | 89/33 CA |
| 3,429,221 | 2/1969 | Kirkpatrick | 89/33 BC |

FOREIGN PATENT DOCUMENTS 793,371  4/1958  United Kingdom ............... 89/33 C Primary Examiner—Stephen C. Bentley
Attorney, Agent, or Firm—Bailin L. Kuch

[57] ABSTRACT

A conveyor mechanism comprises a sprocket having a plurality of concave cutouts and receiving an endless chain of elements, each element having a convex surface, each of said cutouts having a supplemental indexing cutout associated therewith and each of said elements having a supplemental indexing projection thereon, said indexing cutouts and projections mutually interfitting and precluding rotation of each element in the respective sprocket cutout.

6 Claims, 5 Drawing Figures

CONVEYOR MECHANISM

BACKGROUND OF THE INVENTION

1. Field of the Invention

This invention relates to conveyor mechanisms, and particularly to a combination of a turn-around sprocket and an endless chain of conveyor elements which rides thereon, especially adapted for use in high rate of fire, ammunition handling systems.

2. Prior Art

Conveyor mechanisms in high rate of fire, ammunition handling systems are shown in U.S. Pat. No. 3,429,221 issued to R. C. Kirkpatrick on Feb. 25, 1969; U.S. Pat. No. 3,437,005 issued to J. M. Trumper on Apr. 8, 1969; and U.S. Pat. No. 3,670,863 issued to O. H. Meier on June 20, 1972.

In the system shown by Kirkpatrick, the conveyor comprises a sprocket and an endless chain of ammunition conveyor elements. Each element is substantially one half of a cylinder, cut along its longitudinal axis, so that it has a semi-circular concave inner surface to receive the case of the round, and a semi-circular outer surface to mate with one of a plurality of congruent cutouts in the sprocket. The sprocket may have two spaced apart plates with mutually aligned cutouts, both plates being fixed to a hub. Each element has a forwardly extending arm which is coupled to a rearwardly extending bifurcated arm of the next preceeding element, to form the articulated endless chain. The sprocket thus engages and positively drives each element in sequence. The pivot pins travel at a constant velocity both in the straight run and around the sprocket, thus maintaining a constant belt velocity. The centerline of travel of the rounds is spaced from the centerline of travel of the couplings between the elements. Typically, the round carried in the conveyor element, as it travels around the sprocket, is divered by stationary guides from the respective element into another sprocket; i.e. a "hand off." As the round engages the stationary guides, it back loads the elements, and, since the sprocket cutouts and the element outer bearing surfaces are mating semicircles, there is a tendency for the element to rotate within the cutout within the freeplay permitted by the next preceeding and next succeeding elements, and any longitudinally extending guide feet. Such rotation is disadvantageous as it causes nonsynchronization between the handing-off element and the handing-in sprocket, and also causes accordioning of the preceeding elements in the chain. The nonsynchronization will result in the handing-in sprocket cutting into the case of the handed round. The accordioning may result in binding of the longitudinally extending feet of the elements in their guides.

SUMMARY OF THE INVENTION

It is an object of this invention to provide an improved combination of a sprocket and an endless chain of conveyor elements which precludes rotation of the element within the cutouts of the sprocket.

A feature of this invention is the provision of a sprocket having a plurality of concave cutouts and receiving an endless chain of elements, each element having a convex surface, each of said cutouts having a supplemental indexing cutout associated therewith and each of said elements having a supplemental indexing projection thereon, said indexing cutouts and projections mutually interfitting and precluding rotation of each element in the respective sprocket cutout.

BRIEF DESCRIPTION OF THE DRAWING

These and other objects, features and advantages of this invention will be apparent from the following specification thereof, taken in conjunction with the accompanying drawing, in which.

DESCRIPTION OF THE FIRST EMBODIMENT OF THE INVENTION

Figure 1:
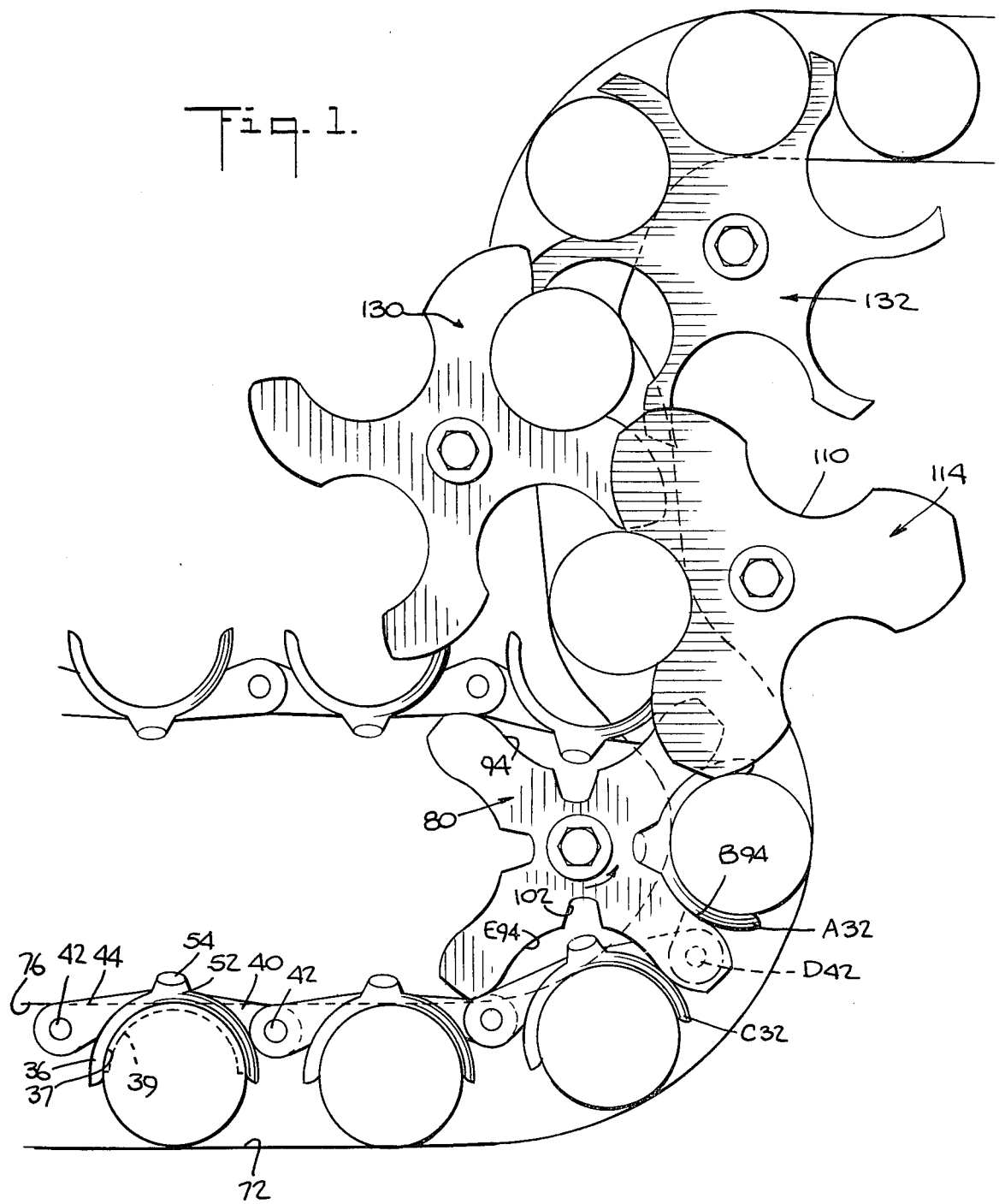
FIG. 1 is a side view, in elevation, partially broken away, of a conveyor system embodying a first embodiment of this invention.
Figure 2:
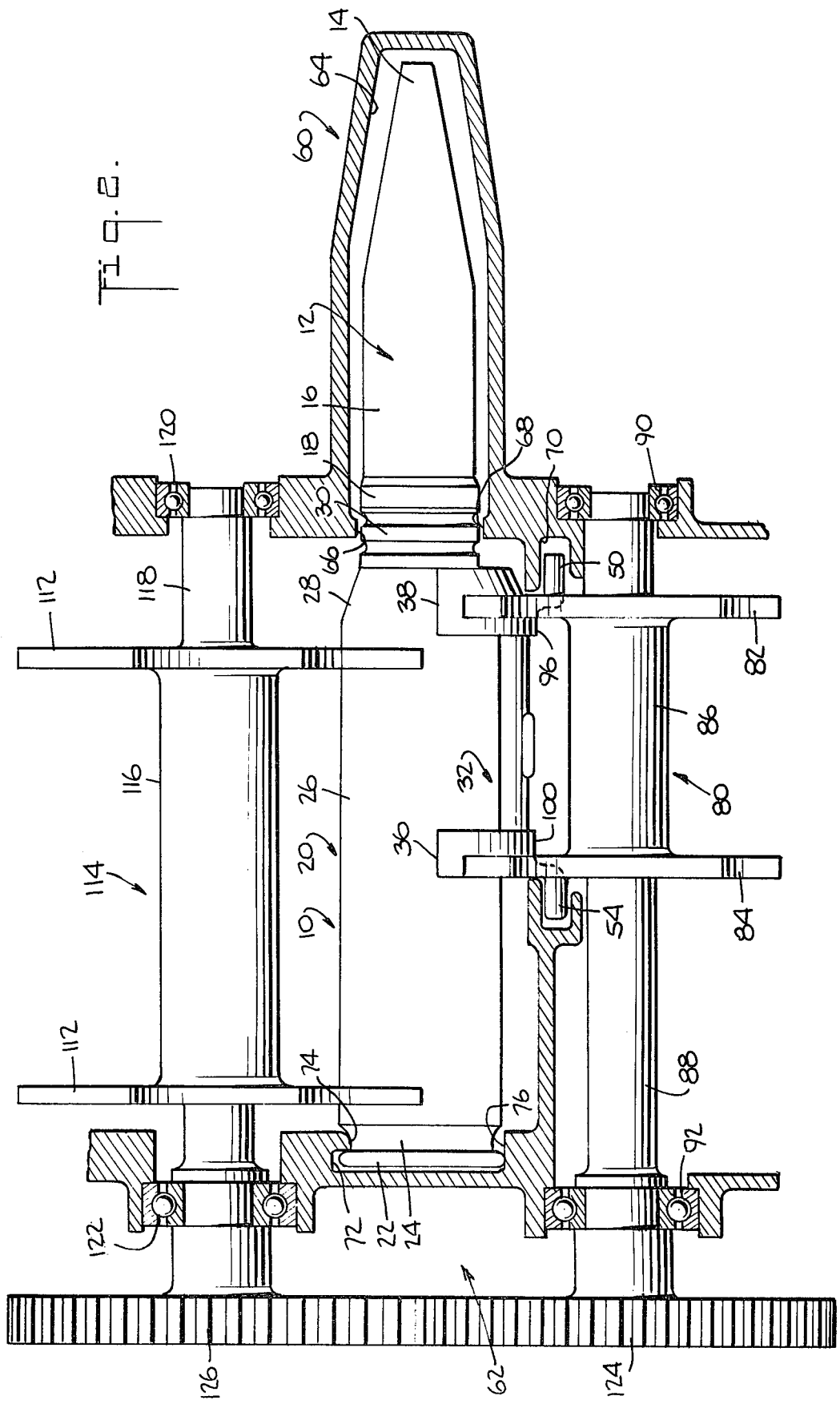
FIG. 2 is a front view, in elevation, partially broken away, of the system of FIG. 1.

The embodiment shown in FIGS. 1 and 2 is an improvement on the system shown in U.S. Pat. No. 3,429,221, supra, to which reference may be had for a description of a complete system.

The system is adapted to convey rounds of ammunition in sequence, each round 10 comprising a projectile 12 with a nose 14, a base 16, and a band 18, and a case 20 with an extractor disk 22, and extractor groove 24, a body 26, a conical shoulder 28, and a neck 30.

The system includes an endless chain of conveyor elements 32. Each element has a body 34, an aft plate 36 integral with the body and having a concave cylindrical surface 37 adapted to receive the case body 26, a forward plate 38 integral with the body and having a concave conical surface 39 adapted to receive the case shoulder 28; a single forwardly projecting arm 40 integral with the body and having a transverse hole to receive a pivot pin 42; a bifurcated rearwardly projecting arm 44 integral with the body and having a transverse hole to receive the pivot pin 42; a forward leg 48 integral with and depending from said plate 38 and having a transversely extending foot 50; and an aft leg 52 integral with and depending from said plate 36 and having a transversely extending foot 54.

The endless chain of conveyor elements travels within a housing having a forward portion 60 and an aft portion 62. The forward portion 60 includes a concavity 64 adapted to pass the projectiles 12, an upper guide surface 66 and a lower guide surface 68 guiding on the neck 30 of the case, and a channel 70 to receive and guide the feet 50. The aft portion 62 includes a concavity 72 adapted to pass the extractor disks 22, an upper guide surface 74 guiding on the extractor groove 24, and a lower guide surface 76 guiding the periphery of the extractor disk 22.

A turnaround sprocket 80 includes a forward plate 82 and an aft plate 84 integral with a hub 86 fixed on a shaft 88 journalled on bearings 90 and 92 to the housing. The pair of plates respectively have four cutouts 94 of a generally semicircular outline; respectively receiving a forward convex cylindrical surface 96 on the element plate 38 and an aft convex cylindrical surface 100 on the saft plate 36. Adjacent cutouts 94 mutually define respective sprocket teeth. Each cutout 94 also includes a supplemental cutout 102 at the symmetric base of the semicircular outline, adapted to receive and mate with an element leg 48 or 52 respectively. The legs and supplemental cutouts are advantageously made of substantially triangular outline. Thereby as each conveyor element enters into a respective pair of cutouts in the sprocket 80, its legs 48 and 52 align and lock the element in the pair of cutouts and preclude relative rotation of the conveyor element within the pair of cutouts. As seen in the lower half of FIG. 1, the conveyor element A32 is locked into alignment in the cutout B94, while the conveyor element C32 is pivoting about the pin D42 into the cutout E94. The sprocket teeth are rounded as shown in FIG. 1 to provide clearance for the pivoting element.

As the sprocket 80 turns counterclockwise, the guide surfaces of the housing diverge, to cam the round of ammunition out of the conveyor element and into the cutouts 110 in a pair of plates 112 of a transfer sprocket 114 whose hub 116 is fixed on a shaft 118 journalled in bearings 120 and 122 in the housing. Synchronization between the sprockets 80 and 114 is provided by meshing gears 124 and 126 respectively fixed to the sprocket shafts. The transfer sprocket hands the rounds to a pitch change sprocket 130 which hands the rounds to a drum sprocket 132.

The supplemental cutouts 102 and mating legs 52 and 48 effectively preclude rotation of any element within the sprocket cutout, and any resultant shifting of the relative location of the adjacent pivot pins 42, and resultant misalignment of the adjacent conveyor elements, which might otherwise be caused by the element from which a round is being cammed being rotated by the applied forces being developed against the round and reacted into the conveyor element, and the drag forces developed in the trailing portion of the chain.

It should be noted that the legs 52 and 48 must not project from the convex surfaces of the conveyor elements so far as to interfere with the sprocket cutout surfaces 94 and the conveyor element in swinging into or out of the cutout about the adjacent pivot pin 42. The surface 94 must not be cut away to provide the supplemental cutout 102 so far as to provide inadequate load transfer area to the conveyor element.

DESCRIPTION OF ADDITIONAL EMBODIMENTS OF THE INVENTION

Other interlocking mechanisms may be provided to preclude rotation of the element within the socket recess.

Figure 3:
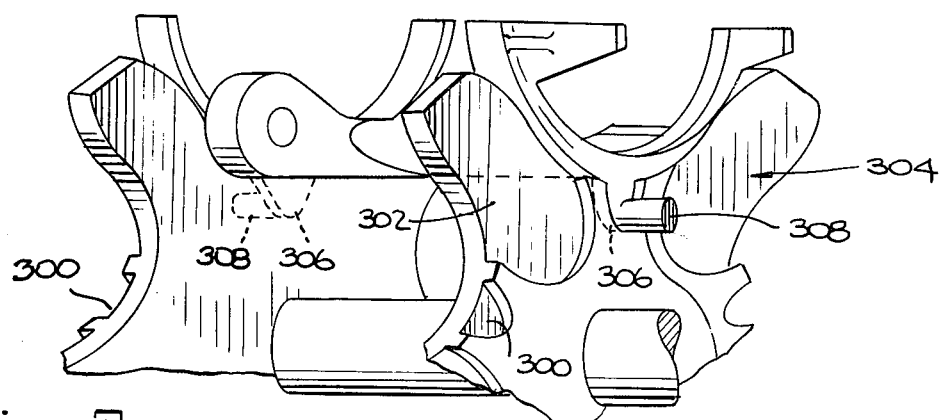
FIGS. 3, 4 and 5 illustrate alternative embodiments.

As shown in FIG. 3, a blind recess 300 may be provided into the exterior surface 302 of each plate 304 of the sprocket to receive the heel 306 of the foot 308 of the element 310.

Figure 4:
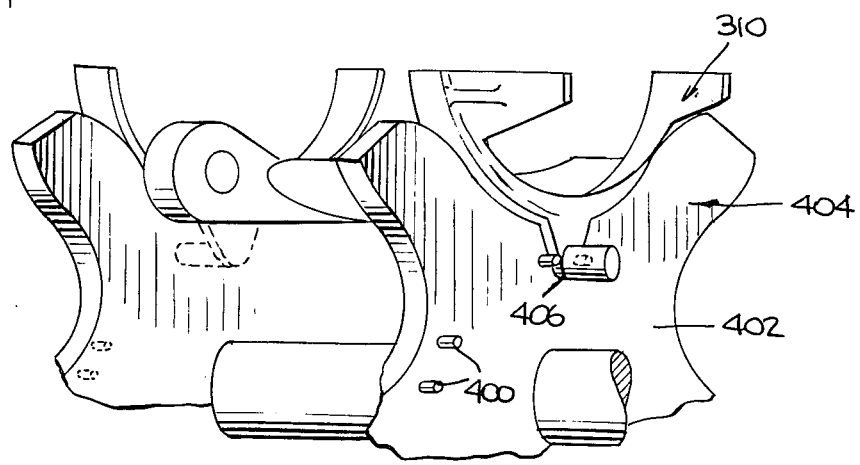

As shown in FIG. 4, a pair of pins 400 may be provided extending from the exterior surface 402 of each plate 404 of the sprocket to receive therebetween the heel 406 of the foot 408 of the element 410.

Figure 5:
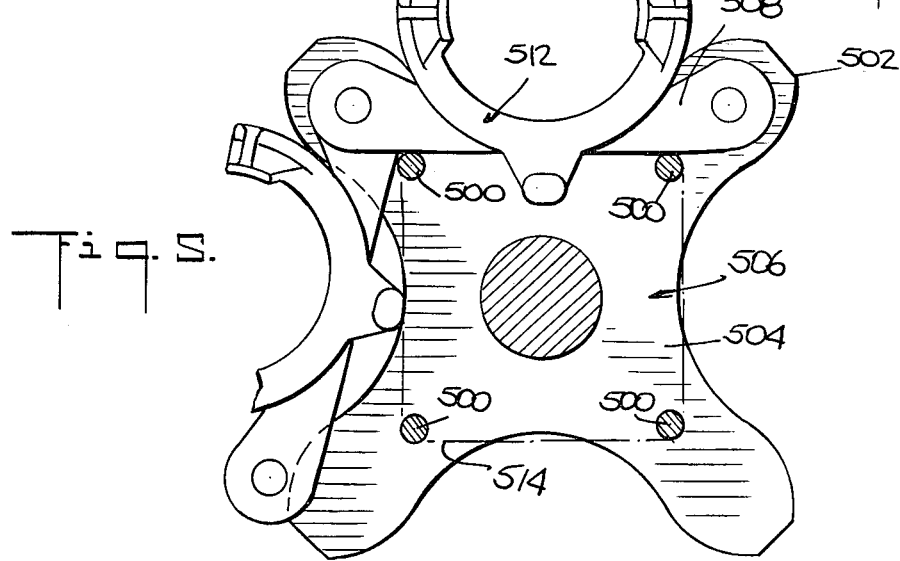

As shown in FIG. 5, a pin 500 may be provided in radial alignment with each tooth 502 extending from the interior surface 504 of each plate 506 of the sprocket to abut the adjacent rearwardly projecting arm 508 or the adjacent forwardly projecting arm 510 of the element 512. In lieu of the pins a hub 514 may be provided having flat surfaces with intermediate corners as defined by the pins 500.

What is claimed is:
1. A conveyor system comprising:
 a sprocket; and
 a chain of conveyor elements;
 each of said conveyor elements having a body portion including:
  a convex cylindrical surface having a first radius defining a longitudinal axis,
  a projecting leading rigid arm having a distal first portion of a pivot means,
  a projecting trailing rigid arm having a distal second portion of a pivot means for coupling with the first portion of a pivot means of the leading arm of the next succeeding element said arms having a mode of operation such that immediately adjacent arms mutually pivot about a common axis;
 said sprocket including:
  a hub having a longitudinal axis,
  a pair of spaced apart plates fixed on said hub and having a plurality of pairs of longitudinally aligned concave recesses therein congruent with and for seating the convex surface of a respective element body portion,
  said hub having a like plurality of surfaces, one adjacent each of said pairs of sprocket concave recesses, for underlying and abutting the leading and trailing arms of a respective element when its body portion is seated in a respective pair of sprocket concave recesses.

2. In a conveyor system comprising:
 a sprocket;
 a chain of conveyor elements; and
 a pair of longitudinally spaced apart guide channels;
 each of said conveyor elements having a body portion including:
  a convex cylindrical surface having a first radius defining a longitudinally extending first axis,
  a projecting leading arm having a distal first portion of a pivot means,
  a projecting trailing arm having a distal second portion of a pivot means for coupling with the first portion of a pivot means of the leading arm of the next succeeding element in said chain,
  a pair of longitudinally spaced apart legs, each having a proximal portion and a longitudinally extending distal portion, said distal portions for respectively interengaging said channels,
 a sprocket including:
  a pair of longitudinally spaced apart plates having a plurality of pairs of longitudinally aligned first concave recesses therein congruent with and for seating the convex surface of a respective element body portion;
 the improvement wherein:
  said pair of longitudinally spaced apart plates of said sprocket additionally includes:
   a like plurality of pairs of longitudinally aligned second concave recesses, each pair of second recesses respectively enlarging a pair of said first recesses, for respectively seating at least a respective portion of each of said legs, for locking said respective element against rotation about its respective first axis within the respective pair of first recesses.

3. In a conveyor system according to claim 2 wherein:
 each element pivots into a respective pair of said first concave recesses about the pivot means formed on its leading arm, and
 each element pivots out of a respective pair of said first concave recesses about the pivot means formed on its trailing arm;
 the improvement of:
  said respective portions of said legs of said element are fully seated in said second concave recesses concurrently as said body portion convex surface is fully seated in said first concave recesses, and said respective portions of said legs of said element unseat from said second concave recesses concurrently as said body portion convex surface unseats from said first concave recesses.

4. In a conveyor system according to claim 3 the improvement wherein:
   each of said second concave recesses is a complete cut out of said plate extending the periphery of the respective adjacent first concave recess.

5. In a conveyor system according to claim 3 the improvement wherein:
   each of said second concave recesses is a blind recess into the side wall of said plate adjacent the respective first concave recess.

6. In a conveyor system according to claim 3 the improvement wherein:
   each of said second concave recesses is a blind recess defined on the side wall of said plate by a plurality of projections extending from said side wall adjacent the respective first concave recess.

* * * * *

UNITED STATES PATENT OFFICE
CERTIFICATE OF CORRECTION

Patent No. 4,044,649              Dated  August 30, 1977

Inventor(s)   Frank Wilder

It is certified that error appears in the above-identified patent and that said Letters Patent are hereby corrected as shown below:

Column 2, line 60 change "saft" to --aft--.
Column 3, line 68 after "longitudinal" insert --first--.

Signed and Sealed this

Seventh Day of March 1978

[SEAL]

Attest:

RUTH C. MASON
Attesting Officer

LUTRELLE F. PARKER
Acting Commissioner of Patents and Trademarks